United States Patent [19]
Wakatsuki et al.

[11] Patent Number: 4,801,650
[45] Date of Patent: Jan. 31, 1989

[54] PROCESS FOR PRODUCING 4-METHYLPENTENE-1 COPOLYMER AND RESIN COMPOSITION CONTAINING THE SAME

[75] Inventors: Kizuku Wakatsuki; Kazuki Wakamatsu, both of Chiba, Japan

[73] Assignee: Sumimoto Chemical Co., Ltd., Osaka, Japan

[21] Appl. No.: 93,286

[22] Filed: Sep. 4, 1987

[30] Foreign Application Priority Data

Sep. 4, 1986 [JP] Japan .................. 61-208767

[51] Int. Cl.$^4$ .................. C08L 23/18; C08F 210/14
[52] U.S. Cl. .................. 525/194; 525/191; 525/198; 525/240; 525/268; 525/270; 526/348.3; 526/348.4; 528/481; 528/503
[58] Field of Search .................. 525/191, 240, 194

[56] References Cited

U.S. PATENT DOCUMENTS

| | | | |
|---|---|---|---|
| 3,692,712 | 9/1972 | Brooks | 525/240 |
| 4,146,591 | 3/1979 | Fuki et al. | 525/321 |
| 4,166,057 | 8/1979 | Takemori | 525/240 |
| 4,645,797 | 2/1987 | Suga et al. | 525/191 |
| 4,659,792 | 4/1987 | Kashiwa et al. | 525/268 |
| 4,727,113 | 2/1988 | Kohyama et al. | 525/194 |

FOREIGN PATENT DOCUMENTS 0125910 11/1984 European Pat. Off. .
8517330 5/1985 Japan .
1568659 6/1980 United Kingdom .

OTHER PUBLICATIONS

European Search Report.

Primary Examiner—Carman J. Seccuro
Attorney, Agent, or Firm—Sughrue, Mion, Zinn, Macpeak & Seas

[57] ABSTRACT

A process for producing a 4-methylpentene-1 copolymer comprising copolymerizing 4-methylpentene-1 with other α-olefin in a hydrocarbon solvent in the presence of a Ziegler-Natta catalyst and a resin composition containing the 4-methylpentene-1 copolymer are disclosed. The copolymerization comprises a first stage in which (A) a homopolymer or random copolymer of 4-methylpentene-1 having an α-olefin content of not more than 3 mol % and an intrinsic viscosity of at least 2.5 dl/g is prepared and a second stage in which (B) a random copolymer having an α-olefin content higher than that of the polymer (A) and no higher than 9 mol % and an intrinsic viscosity of at least 2.5 dl/g is prepared, and the produced copolymer insoluble in the solvent is separated to recover a 4-methylpentene-1 copolymer containing from 5 to 80% by weight of the polymer (A). The process produces a solvent-insoluble copolymer in an increased yield without impairing transparency of the copolymer.

16 Claims, No Drawings

PROCESS FOR PRODUCING 4-METHYLPENTENE-1 COPOLYMER AND RESIN COMPOSITION CONTAINING THE SAME

FIELD OF THE INVENTION

This invention relates to a process for producing a copolymer comprising 4-methylpentene-1 and a minor proportion of other α-olefin and to a resin composition containing the 4-methylpentene-1 copolymer.

BACKGROUND OF THE INVENTION

A homopolymer of 4-methylpentene-1 is a lightweight resin excellent in transparency. It is known that transparency of the 4-methylpentene-1 homopolymer can further be improved by modifying with a small amount of a straight chain α-olefin having from 5 to 18 carbon atoms as disclosed in Japanese Patent Publication No. 22077/75.

In general processes for producing 4-methylpentene-1 polymers by slurry polymerization, only a powdery polymer which is insoluble in a polymerization solvent is separated and recovered as a product. Recovery of both a solvent-insoluble polymer and a solvent-soluble polymer requires complicated procedures and entails high cost.

Conventional processes for producing random copolymers comprising 4-methylpentene-1 and a minor proportion of other α-olefin produce a solvent-insoluble polymer in a low yield as compared with the case of producing a 4-methylpentene-1 homopolymer, resulting in higher production cost.

SUMMARY OF THE INVENTION

One object of this invention is to provide a process for producing a random copolymer comprising 4-methylpentene-1 and a minor proportion of other α-olefin by which an increased yield of a solvent-insoluble polymer can be attained.

Another object of this invention is to provide a process for producing a random cpolymer comprising 4-methylpentene-1 and a minor proportion of other α-olefin having excellent transparency and impact resistance.

A further object of this invention is to provide a 4-methylpentene-1 resin composition suitable for molding.

In general, the aforesaid 4-methylpentene-1 copolymer preferably has a high α-olefin content for improving transparency and impact resistance, while a low α-olefin content is preferred for improving yield of the polymer insoluble in the polymerization solvent. The inventors have conducted extensive studies for the purpose of satisfying these conflicting requirements and, as a result, found that the above objects of the present invention can be accomplished by a two-stage process comprising a first stage in which a copolymer having a low α-olefin content and a high intrinsic viscosity is prepared and a second stage in which a copolymer having a higher α-olefin content than that of the copolymer obtained in the first stage and a high intrinsic viscosity is prepared.

The present invention provides a process for producing a copolymer comprising 4-methylpentene-1 and other α-olefin by copolymerizing 4-methylpentene-1 and other α-olefin in a hydrocarbon solvent in the presence of a Ziegler-Natta catalyst, wherein the copolymerization comprises a first stage in which (A) a homopolymer or random copolymer of 4-methylpentene-1 having an α-olefin content of not more than 3 mol% and an intrinsic viscosity of at least 2.5 dl/g is prepared and a second stage in which (B) a random copolymer having an α-olefin content higher than that of the polymer (A) and no higher than 9 mol% and an intrinsic viscosity of at least 2.5 dl/g is prepared, and the produced copolymer insoluble in the solvent is separated to recover a 4-methylpentene-1 copolymer containing from 5 to 80% by weight of the polymer (A).

The present invention further provides a 4-methylpentene-1 resin composition which is obtained by thermal decomposition or peroxide decomposition of the above-prepared 4-methylpentene-1 copolymer.

DETAILED DESCRIPTION OF THE INVENTION

The polymer (A) preferably contains not more than 2 mol%, and more preferably not more than 1.5 mol%, of α-olefin. The copolymer (B) preferably contains not more than 8 mol% of α-olefin.

The terminology "intrinsic viscosity" as used herein means an intrinsic viscosity as measured in tetralin at 135° C. The polymers (A) and (B) preferably have an intrinsic viscosity of at least 2.5 dl/g, preferably at least 3.5 dl/g, and more preferably at least 5 dl/g.

In the case where the 4-methylpentene-1 copolymers obtained by the process of the present invention are unsuitable for molding as produced due to high molecular weights, they can be decomposed by heat or with peroxides so as to have reduced molecular weights suitable for molding. The thermal decomposition is preferably carried out at a temperature ranging from 250° to 330° C. The peroxides which can be used preferably include compounds having a half-life period of 10 hours at a temperature of at least 100° C., such as dicumyl peroxide, 2,5-dimethyl-2,5-di-t-butyl peroxyhexane, di-t-butyl peroxide, and the like.

For ensured manifestation of the effects produced by the present invention, the proportion of the polymer (A) in the whole solvent-insoluble polymer ranges from 5 to 80%, preferably from 20 to 80%, and more prerferably from 40 to 80%, by weight.

The polymerization is carried out in the substantial absence of water or oxygen as is usual in the polymerization of general α-olefins. Hydrogen is a preferred molecular weight regulator. As the polymerization temperature becomes low, the yield of the solvent-insoluble polymer increases but the polymerization activity decreases. Accordingly, the polymerization temperature is selected from the range of from 0° to 90° C., preferably from 20° to 70° C., and more preferably from 30° to 60° C. The polymerization pressure is preferably from atmospheric pressure to 5 kg/cm$^2$.

The Ziegler-Natta catalyst which can be used in the present invention preferably includes stereospecific polymerization catalysts for α-olefins as described in Japanese Patent Application (OPI) Nos. 59916/82, 126401/84, and 228504/85 (the term "OPI" as used herein means an "unexamined published application"). More specifically, transition metal compounds to be used include titanium trichloride obtained by reducing titanium tetrachloride with aluminum, an organoaluminum compound, an organomagnesium compound, etc.; titanium compounds carried on magnesium halides, silicon dioxide, etc.; and the like. Organometallic compounds to be used preferably include organoaluminum compounds, e.g., a trialkylaluminum, a dialkylaluminum halide, an alkylaluminum sesquihalide, etc.

The hydrocarbon solvent to be used for polymerization preferably includes those hardly dissolving produced 4-methylpentene-1 copolymers, such as aliphatic hydrocarbons, e.g., heptane, hexane, pentane, butane, etc. The 4-methylpentene-1 monomer per se may also serve as a polymerization solvent.

The α-olefins which can be copolymerized with 4-methylpentene-1 preferably include those having from 2 to 20 carbon atoms, e.g., ethylene, propylene, butene, pentene, n-hexene-1, 3-methylbutene-1, 4-methylhexene-1, n-octene-1, n-decene-1, n-octadecene-1, etc. Of these, straight chain α-olefins having from 5 to 18 carbon atoms are more preferred.

The present invention will now be illustrated in detail with reference to the following examples, but it should be understood that these examples are not deemed to limit the present invention. In these examples, all the parts are given by weight unless otherwise indicated.

EXAMPLES 1 TO 7

A 1 l-volume autoclave was thoroughly dried and purged with nitrogen gas. From 0.1 to 0.3 g of titanium trichloride (produced by Marubeni-Solvay Co., Ltd.), 1 g of diethylaluminum chloride, from 0.05 to 15 Nl of hydrogen, 325 g of 4-methylpentene-1, and decene-1 in an amount shown in Table 1 were charged in the autoclave, and two-stage polymerization was carried out using 4-methylpentene-1 as a polymerization solvent under conditions shown in Table 1.

After completion of the polymerization, n-butanol was added to the polymerization system to stop the reaction. The resulting slurry was filtered at the polymerization temperature. The solvent-insoluble polymer recovered as a filter cake was washed with a hydrochloric acid aqueous solution and then washed with methanol until the washings had become neutral, to recover the polymer as a white powder. On the other hand, the solvent-soluble polymer was recovered from the filtrate, and the yield of the solvent-insoluble polymer was calculated from the formula:

$$\frac{\text{(Weight of Insoluble Polymer)}}{\text{(Weight of Insoluble Polymer)} + \text{(Weight of Soluble Polymer)}} \times 100$$

Upon completion of the first stage polymerization, a part of the resulting slurry was sampled, and its slurry concentration was measured to obtain the amount of the polymer (A). Further, the polymer (A) was isolated from the slurry and purified to determine the decene-1 content and intrinsic viscosity of the polymer (A). The decene-1 content and intrinsic viscosity of the polymer (B) were calculated from those values of the polymer (A) and the solvent-insoluble polymer [(A)+(B)].

The intrinsic viscosity [η] was measured in tetralin at 135° C. by the use of a Ubbellohde viscometer. The decene-1 content was determined by infrared spectrophotometry. The haze of the resulting copolymer was determined as follows. A resin compound comprising 100 parts of the copolymer and, as stabilizers, 0.5 part of 2,6-di-t-butylhydroxytoluene and 0.1 part of tetrakis[methylene-3-(3′,5′-di-t-butyl-4-hydroxyphenyl)propionate]methane was kneaded at 280° C. and compression-molded in a 1.0 mm-thick sheet according to JIS K6758 except for changing the compressing temperature to 280° C. The press sheet was dipped in dimethyl phthalate, and its haze was measured according to ASTM D 1003.

The results of these measurements are shown in Table 1.

COMPARATIVE EXAMPLES 1 TO 6

4-Methylpentene-1 and decene-1 were random copolymerized in one stage according to the conventional process or in two stage as in the present invention, except that the produced polymers (A) and (B) had low intrinsic viscosities. The polymerization conditions and results obtained are shown in Table 1.

It can be seen from Table 1 that the process according to the present invention produces solvent-insoluble 4-methylpentene-1 copolymers in improved yields while retaining high transparency.

TABLE 1

| | First Stage | | | Second Stage | | | Yield of Solvent-Insoluble Copolymer (wt %) |
|---|---|---|---|---|---|---|---|
| | Polymn. Temp. (°C.) | Polymn. Time (hr) | Decene-1 Feed (wt %) | Polymn. Temp. (°C.) | Polymn. Time (hr) | Decene-1 Feed (wt %) | |
| Example No. | | | | | | | |
| 1 | 50 | 1 | 0.3 | 50 | 5 | 1.1 | 98.6 |
| 2 | 50 | 2.5 | 0.3 | 50 | 3.5 | 1.5 | 98.8 |
| 3 | 50 | 5 | 0.7 | 40 | 2 | 2.2 | 97.3 |
| 4 | 50 | 1 | 1.1 | 50 | 5 | 1.7 | 96.5 |
| 5 | 50 | 0.5 | 0.7 | 40 | 6 | 2.5 | 94.1 |
| 6 | 50 | 0.5 | 0.7 | 40 | 6 | 2.1 | 96.6 |
| 7 | 50 | 2 | 0.7 | 40 | 4 | 3.7 | 96.4 |
| Comparative Example No. | | | | | | | |
| 1 | 40 | 5 | 1.2 | — | — | — | 94.7 |
| 2 | 50 | 3 | 1.8 | — | — | — | 87.1 |
| 3 | 40 | 2 | 2.3 | — | — | — | 88.2 |
| 4 | 40 | 2 | 3.3 | — | — | — | 77.4 |
| 5 | 40 | 6 | 2.3 | — | — | — | 93.0 |
| 6 | 50 | 3 | 1.8 | 50 | 3 | 4.1 | 78.5 |

| Polymer (A) | Polymer (B) | Total Copolymer [Polymer (A) + Polymer (B)] |
|---|---|---|
| Decene- | Decene- | Decene- Polymer |

TABLE 1-continued

| | [η] (dl/g) | 1 (mol %) | [η] (dl/g) | 1 (mol %) | [η] (dl/g) | 1 (mol %) | (A) (wt %) | Haze (%) |
|---|---|---|---|---|---|---|---|---|
| Example No. | | | | | | | | |
| 1 | 5.4 | 0.3 | 5.9 | 1.7 | 5.8 | 1.4 | 20 | 2.2 |
| 2 | 5.0 | 0.3 | 6.2 | 2.1 | 5.6 | 1.2 | 50 | 2.2 |
| 3 | 6.6 | 0.7 | 6.8 | 3.1 | 6.7 | 2.3 | 35 | 1.2 |
| 4 | 4.1 | 1.5 | 4.5 | 2.8 | 4.4 | 2.4 | 30 | 1.5 |
| 5 | 4.8 | 0.8 | 5.3 | 4.0 | 5.2 | 3.5 | 15 | 1.7 |
| 6 | 5.7 | 0.8 | 7.1 | 3.1 | 6.8 | 2.6 | 20 | 2.3 |
| 7 | 5.1 | 0.9 | 7.3 | 7.2 | 6.2 | 4.0 | 50 | 2.3 |
| Comparative Example No. | | | | | | | | |
| 1 | — | — | — | — | 3.4 | 1.3 | — | 2.2 |
| 2 | — | — | — | — | 1.8 | 1.5 | — | 2.4 |
| 3 | — | — | — | — | 2.3 | 1.8 | — | 1.5 |
| 4 | — | — | — | — | 2.3 | 2.4 | — | 2.1 |
| 5 | — | — | — | — | 7.8 | 2.6 | — | 1.7 |
| 6 | 1.8 | 1.4 | 2.1 | 4.5 | 1.9 | 3.1 | 60 | 2.4 |

(Note) The designated amount of decene-1 means a proportion to charged 4-methylpentene-1.

EXAMPLE 8

A hundred parts of the copolymer as prepared in Example 1 was mixed with 0.2 part of tetrakis[methylene-3-(3',5'-di-t butyl-4-hydroxyphenyl)propionate]methane (produced by Ciba-Geigy AG) and 0.1 part of bis(2,4-di-t-butylphenyl)pentaerythritol diphosphite (produced by Borg-Warner Corp.) as stabilizers, and 100 ppm of 2,5-dimethyl-2,5-di-t-butyl peroxyhexane as a polymer decomposing agent. The blend was subjected to decomposing granulation in a single-screw granulator at a cylinder temperature of 270° C. The resulting pellets had an intrinsic viscosity of 2.3 dl/g and a melt flow rate (260° C., 5 kg) of 4 g/10 min., indicative of a molecular weight suited for molding.

When the pellets were molded into a compression-molded sheet of 1 mm thick in the same manner as in the foregoing examples, the haze of the compression-molded sheet was found to be 1.4%.

As described above, 4-methylpentene-1 copolymers excellent in transparency and impact resistance can be produced by the two-stage process of the present invention comprising a first stage for obtaining a 4-methylpentene-1 polymer having a low α-olefin content and a high intrinsic viscosity and a second stage for obtaining a copolymer having an α-olefin content higher than that of the polymer obtained in the first stage and a high intrinsic viscosity. The thus obtained 4-methylpentene-1 copolymer can be thermally decomposed or decomposed with a peroxide to obtain a resin composition having satisfactory molding properties.

While the invention has been described in detail and with reference to specific embodiments thereof, it will be apparent to one skilled in the art that various changes and modifications can be made therein without departing from the spirit and scope thereof.

What is claimed is:

1. A process for producing a 4-methylpentene-1 copolymer comprising copolymerizing 4-methylpentene-1 and other α-olefin in a hydrocarbon solvent in the presence of a Ziegler-Natta catalyst, wherein the copolymerization comprises a first stage in which (A) a homopolymer or random copolymer of 4-methylpentene-1 having an α-olefin content of not more than 3 mol% and an intrinsic viscosity, as measured in tetralin at 135° C., of at least 2.5 dl/g is prepared and a second stage in which (B) a random copolymer having an α-olefin content higher than that of the polymer (A) and no higher than 9 mol% and an intrinsic viscosity, as measured in tetralin at 135° C., of at least 2.5 dl/g is prepared, and the produced copolymer insoluble in the solvent is separated to recover a 4-methylpentene-1 copolymer containing from 5 to 80% by weight of the polymer (A).

2. A process as claimed in claim 1, wherein said other α-olefin is a straight chain α-olefin having from 5 to 18 carbon atoms.

3. A process as claimed in claim 1, wherein the polymer (A) has an α-olefin content of not more than 2 mol%.

4. A process as claimed in claim 3, wherein the polymer (A) has an α-olefin content of not more than 1.5 mol%.

5. A process as claimed in claim 1, wherein the polymer (B) has an α-olefin content of not more than 8 mol%.

6. A process as claimed in claim 1, wherein the polymers (A) and (B) have an intrinsic viscosity of at least 3.5 dl/g.

7. A process as claimed in claim 6, wherein the polymers (A) and (B) have an intrinsic viscosity of at least 5 dl/g.

8. A process as claimed in claim 1, wherein the recovered 4-methylpentene-1 copolymer contains from 20 to 80% by weight of the polymer (A).

9. A process as claimed in claim 8, wherein the recovered 4-methylpentene-1 copolymer contains from 40 to 80% by weight of the polymer (A).

10. A process as claimed in claim 1, wherein said copolymerization is carried out at a temperature of from 0° to 90° C.

11. A process as claimed in claim 10, wherein said copolymerization is carried out at a temperature of from 20° to 70° C.

12. A process as claimed in claim 11, wherein said copolymerization is carried out at a temperature of from 30° to 60° C.

13. A 4-methyl-pentene-1 resin composition which is obtained by subjecting a 4-methylpentene-1 copolymer to thermal decomposition or decomposition with a peroxide, said 4-methylpentene-1 copolymer being produced by a process comprising copolymerizing 4-methylpentene-1 with other α-olefin in a hydrocarbon solvent in the presence of a Ziegler-Natta catalyst, wherein the copolymerization comprises a first stage in which (A) a homopolymer or random copolymer of 4-methylpentene-1 having an α-olefin content of not more than 3 mol% and an intrinsic viscosity, as measured in tetralin at 135° C., of at least 2.5 dl/g is prepared and a second stage in which (B) a random copolymer having an α-olefin content higher than that of the polymer (A) and no higher than 9 mol% and an intrinsic viscosity, as measured in tetralin at 135° C., of at least 2.5 dl/g is prepared, and the produced copolymer insoluble in the solvent is separated to recover a 4-methylpentene-1 copolymer containing from 5 to 80% by weight of the polymer (A).

14. A 4-methylpentene-1 resin composition as claimed in claim 13, wherein said α-olefin is a straight chain α-olefin having from 5 to 18 carbon atoms.

15. A 4-methylpentene-1 resin composition as claimed in claim 13, wherein the thermal decomposition is carried out at a temperature of from 250° to 330° C.

16. A 4-methylpentene-1 resin composiiton as claimed in claim 13, wherein said peroxide is dicumyl peroxide, 2,5-dimethyl-2,5-di-t-butyl peroxyhexane, or di-t-butyl peroxide.

* * * * *